（12）United States Patent
Desjardins

(10) Patent No.: US 12,421,879 B1
(45) Date of Patent: Sep. 23, 2025

(54) OIL FEED MANAGEMENT SYSTEM

(71) Applicant: Pratt & Whitney Canada Corp.,
Québec (CA)

(72) Inventor: Michel Desjardins, Québec (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/653,428

(22) Filed: May 2, 2024

(51) Int. Cl.
*F01M 11/06* (2006.01)
*F16H 57/04* (2010.01)
*F16N 17/00* (2006.01)

(52) U.S. Cl.
CPC ....... *F01M 11/067* (2013.01); *F16H 57/0453* (2013.01); *F16N 17/00* (2013.01); *F16N 2210/09* (2013.01)

(58) Field of Classification Search
CPC ... F01M 11/067; F16H 57/0453; F16N 17/00; F16N 2210/09
See application file for complete search history.

(56) References Cited

U.S. PATENT DOCUMENTS

| | | | | |
|---|---|---|---|---|
| 4,346,786 A * | 8/1982 | Midgley | ............... | F01M 11/067 184/6.4 |
| 5,611,411 A * | 3/1997 | Reilly, III | ............... | F01D 25/20 184/6.24 |
| 8,517,148 B2 | 8/2013 | Portlock et al. | | |
| 8,870,699 B2 | 10/2014 | Lewis et al. | | |
| 10,513,949 B2 | 12/2019 | Parnin et al. | | |
| 11,073,041 B2 * | 7/2021 | Uhkoetter | ................ | F01M 1/02 |
| 11,156,124 B2 | 10/2021 | White et al. | | |
| 11,203,974 B2 | 12/2021 | Sheridan | | |
| 11,619,210 B2 | 4/2023 | Nies | | |
| 2007/0169583 A1 * | 7/2007 | Reis | ................... | F16H 57/0447 74/606 R |
| 2013/0319006 A1 | 12/2013 | Parnin et al. | | |

FOREIGN PATENT DOCUMENTS

EP 1167859 A2 * 1/2002 ............ F16N 17/00

* cited by examiner

*Primary Examiner* — Minh Truong
(74) *Attorney, Agent, or Firm* — CANTOR COLBURN LLP

(57) ABSTRACT

A lubrication system of a gas turbine engine includes a lubricant reservoir with a housing having a volume of oil located therein. A reservoir passage extends through the housing. One or more side passages extend from the reservoir passage and are configured to selectably fill or drain the volume of oil. An output passage is separate and distinct from the reservoir passage, and a separator wall extends into the interior of the housing from the first housing wall toward the second housing wall and between the reservoir passage and the output passage. When the lubricant reservoir is in a first orientation, the lubricant reservoir is filled via oil flowed through the reservoir passage from the first housing end, and when operated in a negative G orientation, the lubricant reservoir is drained via oil flowed through the reservoir passage and out of the second housing end.

20 Claims, 3 Drawing Sheets

OIL FEED MANAGEMENT SYSTEM

BACKGROUND

Exemplary embodiments pertain to the art of gas turbine engines, such as those utilized in aircraft. Aircraft engines can be designed with propeller blades capable of operating with a variable pitch, referred to as propeller blade angle.

Aircraft engines include a reduction gearbox (RGB) which provides the necessary speed ratio from the power turbine shaft to the output shaft (driving the propeller) while carrying the resulting torque. It may also support the propeller shaft 1P moment loads and oil transfer for the propeller pitch actuation. The RGB oil feed system provides the oil flow to the various rolling element bearings and gears. The RGB may also include an auxiliary tank which maintains an oil volume which is used by the feathering pump to guarantee an appropriate amount of oil for a given number of prop pitch excursions from min to max pitch, even if there's no oil feed from the engine main pump, such as on engine shut down (e.g. ground testing). In normal operation, oil feeds, if present, the auxiliary tank at its top portion. Once the tank is filled, the pressurized oil feeds the downstream components, such as gears & bearings via the top portion of the auxiliary tank. This allows the auxiliary tank to stay full, leaving this volume available when the auxiliary pump is used. The feathering pump oil flow pick-up is located at a vertical bottom of the auxiliary tank.

BRIEF DESCRIPTION

In one exemplary embodiment, a lubrication system of a gas turbine engine includes a lubricant reservoir including a housing having a volume of oil located therein. A reservoir passage extends through the housing from a first housing wall to a second housing wall opposite the first housing wall. One or more side passages extend from the reservoir passage into an interior of the housing and are configured to selectably fill or drain the volume of oil. An output passage is separate and distinct from the reservoir passage, and a separator wall extends into the interior of the housing from the first housing wall toward the second housing wall and between the reservoir passage and the output passage. When the lubricant reservoir is in a first orientation, the lubricant reservoir is filled via oil flowed through the reservoir passage from the first housing end, and when operated in a negative G orientation, the lubricant reservoir is drained via oil flowed through the reservoir passage and out of the second housing end.

Additionally or alternatively, in this or other embodiments when the lubricant reservoir is in the second orientation the flow of oil out of the lubricant reservoir via the output passage is stopped.

Additionally or alternatively, in this or other embodiments the one or more side passages is at least two side passages, and a first side passage of the at least two side passages has a first cross-sectional area greater than a second cross-sectional area of a second side passage of the at least two side passages.

Additionally or alternatively, in this or other embodiments the output passage extends from a side wall of the housing between the first housing wall and the second housing wall.

Additionally or alternatively, in this or other embodiments a feathering passage extends into the lubricant reservoir.

Additionally or alternatively, in this or other embodiments a feathering pump is operably connected to the feathering passage to urge oil from the lubricant reservoir via the feathering passage.

Additionally or alternatively, in this or other embodiments is operably connected to the reservoir passage to urge flow through the reservoir passage.

In another exemplary embodiment, a reduction gear box system of a gas turbine engine includes a reduction gear box having one or more journal bearings therein, and a lubricant reservoir configured to provide a flow of oil to the reduction gearbox. The lubricant reservoir includes a housing, a volume of oil located in the housing, and a reservoir passage extending through the housing from a first housing wall to a second housing wall opposite the first housing wall. The reservoir passage is configured to provide the flow of oil to the one or more journal bearings. One or more side passages extend from the reservoir passage into an interior of the housing and are configured to selectably fill or drain the volume of oil. An output passage extends from the housing separate and distinct from the reservoir passage, and a separator wall extends into the interior of the housing from the first housing wall toward the second housing wall and between the reservoir passage and the output passage. When the lubricant reservoir is in a first orientation, the lubricant reservoir is filled via oil flowed through the reservoir passage from the first housing end, and when operated in a negative G orientation, the lubricant reservoir is drained via oil flowed through the reservoir passage and out of the second housing end.

Additionally or alternatively, in this or other embodiments when the lubricant reservoir is in the second orientation the flow of oil out of the lubricant reservoir via the output passage is stopped.

Additionally or alternatively, in this or other embodiments the one or more side passages is at least two side passages, and a first side passage of the at least two side passages has a first cross-sectional area greater than a second cross-sectional area of a second side passage of the at least two side passages.

Additionally or alternatively, in this or other embodiments the output passage extends from a side wall of the housing between the first housing wall and the second housing wall.

Additionally or alternatively, in this or other embodiments a feathering passage extending into the lubricant reservoir.

Additionally or alternatively, in this or other embodiments a feathering pump is operably connected to the feathering passage to urge oil from the lubricant reservoir via the feathering passage.

Additionally or alternatively, in this or other embodiments a main pump is operably connected to the reservoir passage to urge flow through the reservoir passage.

In yet another exemplary embodiment, a gas turbine engine includes a turbine shaft, and a propeller including a plurality of propeller blades; the propeller driven by a propeller shaft. A reduction gear box operably connects the turbine shaft to the propeller shaft. A lubricant reservoir is configured to provide a flow of oil to the reduction gearbox. The lubricant reservoir includes a housing, a volume of oil located in the housing, and a reservoir passage extending through the housing from a first housing wall to a second housing wall opposite the first housing wall. The reservoir passage is configured to provide the flow of oil to the one or more journal bearings of the reduction gear box. One or more side passages extend from the reservoir passage into an interior of the housing configured to selectably fill or drain the volume of oil, and an output passage extends from the housing separate and distinct from the reservoir passage. A separator wall extends into the interior of the housing from the first housing wall toward the second housing wall and between the reservoir passage and the output passage. When the lubricant reservoir is in a first orientation, the lubricant reservoir is filled via oil flowed through the reservoir passage from the first housing end, and when operated in a negative G orientation, the lubricant reservoir is drained via oil flowed through the reservoir passage and out of the second housing end.

Additionally or alternatively, in this or other embodiments when the lubricant reservoir is in the second orientation the flow of oil out of the lubricant reservoir via the output passage is stopped.

Additionally or alternatively, in this or other embodiments the one or more side passages is at least two side passages, and a first side passage of the at least two side passages has a first cross-sectional area greater than a second cross-sectional area of a second side passage of the at least two side passages.

Additionally or alternatively, in this or other embodiments the output passage extends from a side wall of the housing between the first housing wall and the second housing wall.

Additionally or alternatively, in this or other embodiments a feathering passage extends into the lubricant reservoir. The feathering passage is configured to deliver a flow of oil for adjustment of a rotational position of the plurality of propeller blades.

Additionally or alternatively, in this or other embodiments a main pump further includes a main pump operably connected to the reservoir passage to urge flow through the reservoir passage.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
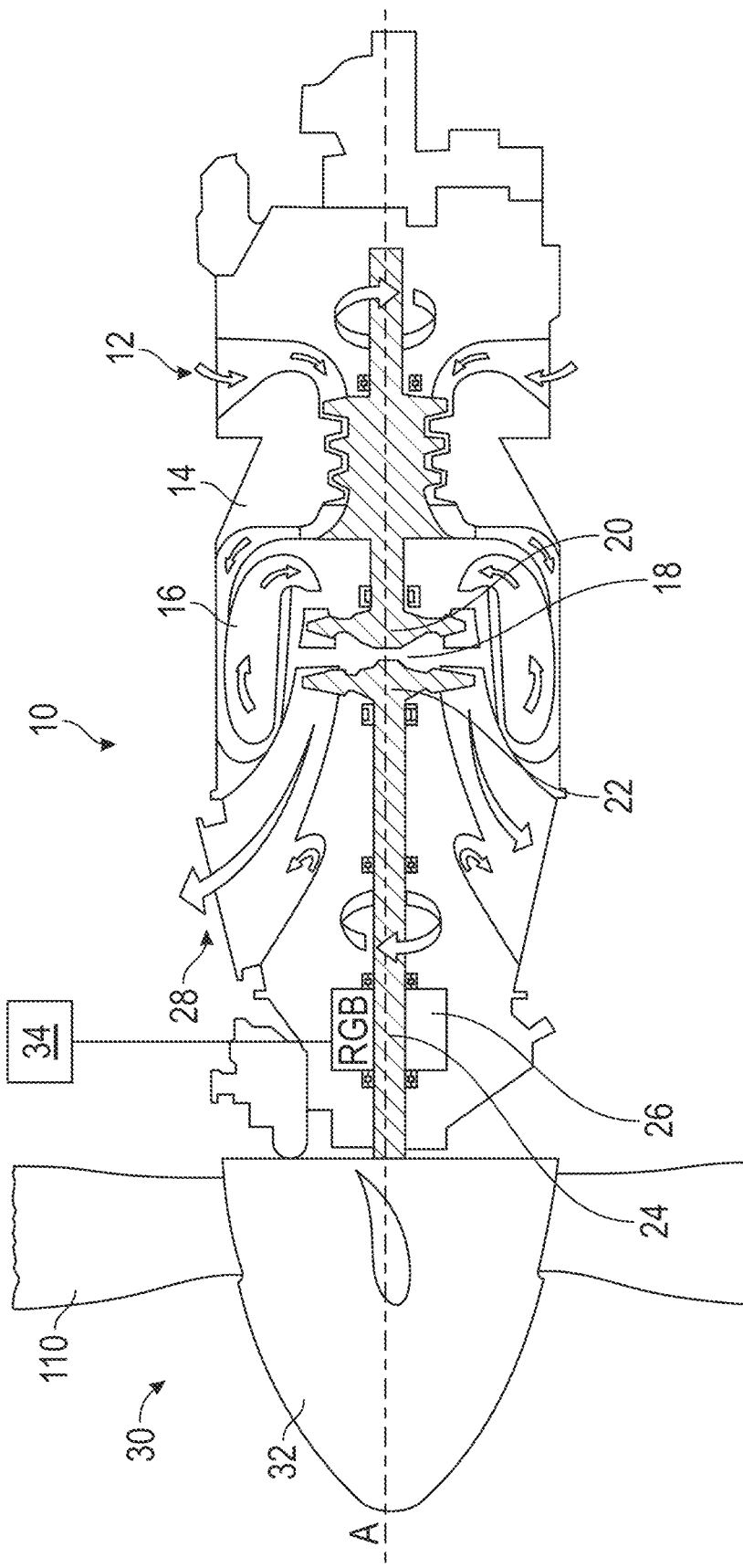
FIG. 1 is a partial cross-sectional view of and embodiment of a gas turbine engine.

With reference now to FIG. 1, a gas turbine engine 10 is illustrated according to a non-limiting embodiment. The gas turbine engine includes an inlet 12, through which ambient air is directed, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and rotatably drives a rotor shaft 24 about a longitudinal propeller shaft axis (A) through a reduction gear box 26. Hot gases may then be evacuated through exhaust stubs 28.

The engine 10 is coupled to a propeller 30. The propeller 30 includes a plurality of circumferentially-arranged blades 110 disposed on a hub 32 and which extend radially therefrom. Each of the blades 110 are rotatable about their own radial axes through a plurality of blade angles, which can be adjusted to achieve modes of operation, such as feather, full reverse, and forward thrust.

Figure 2:
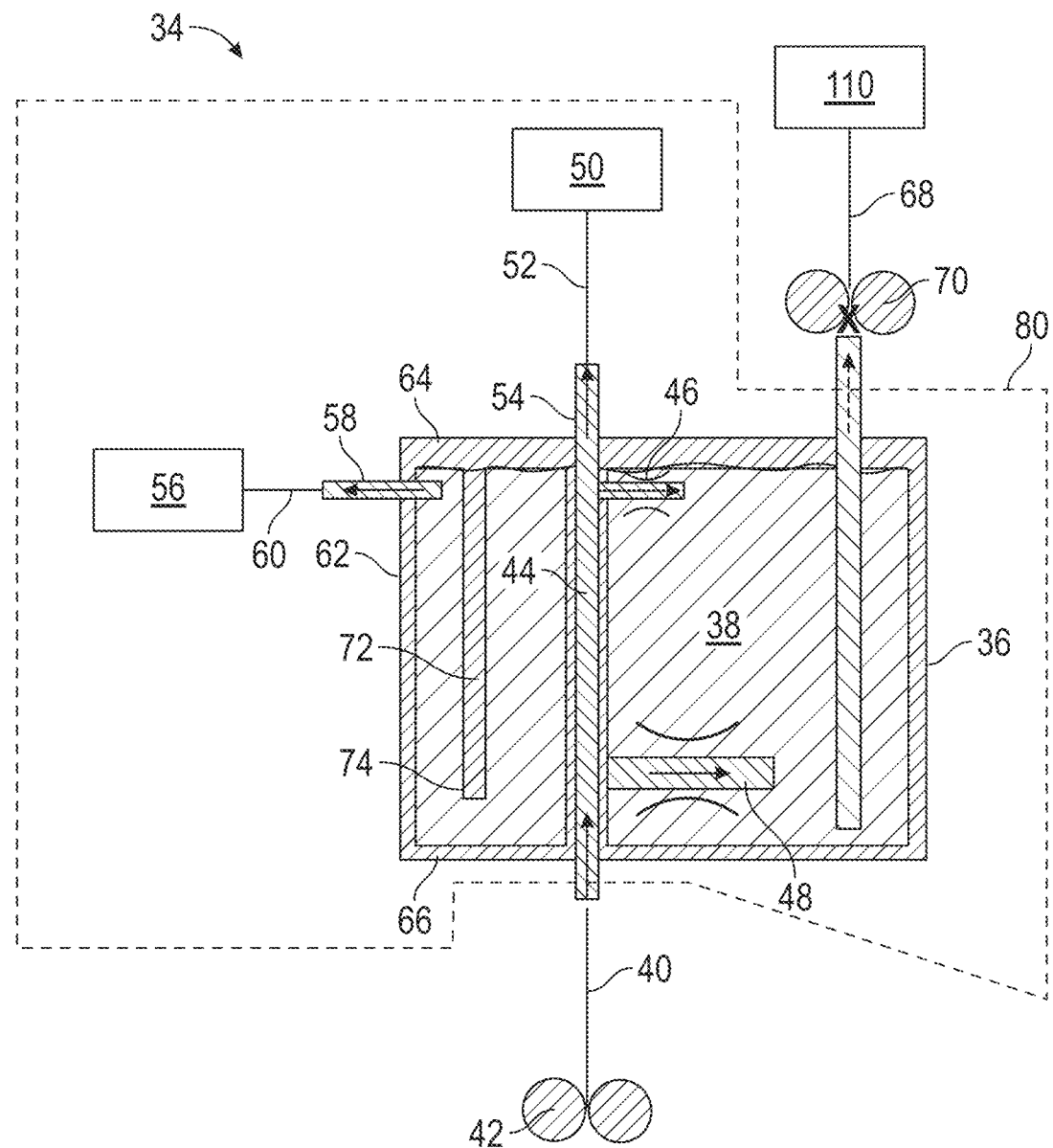
FIG. 2 is a schematic illustration of an embodiment of an oil reservoir of a gas turbine engine under normal operating conditions.

The reduction gear box 26 includes a gear box housing 80 containing gears and nozzles 56 for operation of the reduction gear box 26 and also an oil reservoir 34 to provide oil flow to the gears and bearings 56, and to the blades 110 for feathering actuation of the blades 110. An embodiment of the oil reservoir 34 is illustrated in greater detail in FIG. 2. The oil reservoir 34 includes a reservoir housing 36 and a volume of oil 38 disposed in the reservoir housing 36. A gearbox passage 40 directs oil from the main oil pump 42 to the oil reservoir 34. In some embodiments, the main oil pump 42 is located remotely outside of the gear box housing 80. In a normal operating orientation, as illustrated in FIG. 2, the gearbox passage 40 is coupled to the reservoir housing 36 at a vertical bottom of the reservoir housing 36 such that the oil flow from the main oil pump 42 enters the reservoir housing 36 from the bottom. A housing passage 44 extends through the reservoir housing 36 from bottom to top and includes a first side passage 46 and a second side passage 48 extending from the housing passage 44. The side passages 46, 48 are orifice-controlled and open to the interior of the reservoir housing 36.

The oil reservoir 34 is utilized to provide oil to various components. In some embodiments, the reduction gearbox 26 utilizes oil film journal bearings for compactness. While beneficial economically and for power/density, oil film journal bearings remain sensitive to conditions of oil starvation, such as during negative G or during windmilling condition. For transient, short duration conditions, journal bearings can be fed with little amount of oil, just to sustain the film thickness, provided the heat generation remains below an acceptable range. This is opposed to the rolling element bearings, which can better resist to an oil out condition.

The oil reservoir 34 is therefore configured to maintain necessary oil flow to the journal bearings 50 via a journal bearing passage 52 extending from a journal bearing feed port 54 located, during normal operating conditions at a top of the reservoir housing 36, opposite the gearbox passage 40. The oil reservoir 34 provides oil to the gears and nozzles via outlet port 58 and output passage 60. The outlet port 58 is located in a side wall 62 of the reservoir housing 36. In some embodiments, the outlet port 58 is located in the side wall 62 nearer a top wall 64 than a bottom wall 66 of the reservoir housing 36. In some embodiments, a feathering passage 68 may extend from the oil reservoir 34 to direct oil toward the blades 110 via a feathering pump 70. The feathering passage 68 extends through the reservoir housing 36 into the interior thereof, and in normal orientation is fed from near the vertical bottom of the reservoir housing 36. The reservoir housing 36 further includes a separator wall 72 in the interior of the reservoir housing 36, which extends from the top wall 64 toward the bottom wall 66, without intersecting the bottom wall 66.

During normal operation of the gas turbine engine 10, oil flow is split between directing oil to fill the oil reservoir 34 via the first side passage 46 and the second side passage 48, toward the journal bearings 50 via the journal bearing passage 52, and toward the additional components 56 via the output passage 60. Since the bearing passage 52 is an extension of the housing passage 44, this less restrictive path prioritizes oil flow toward the journal bearings 50 to ensure their adequate lubrication. Secondarily, oil fills the oil reservoir 34 via the side passages 46, 48. Once the oil reservoir 34 is filled, pressurized oil will be pushed through the output passage 60.

Figure 3:
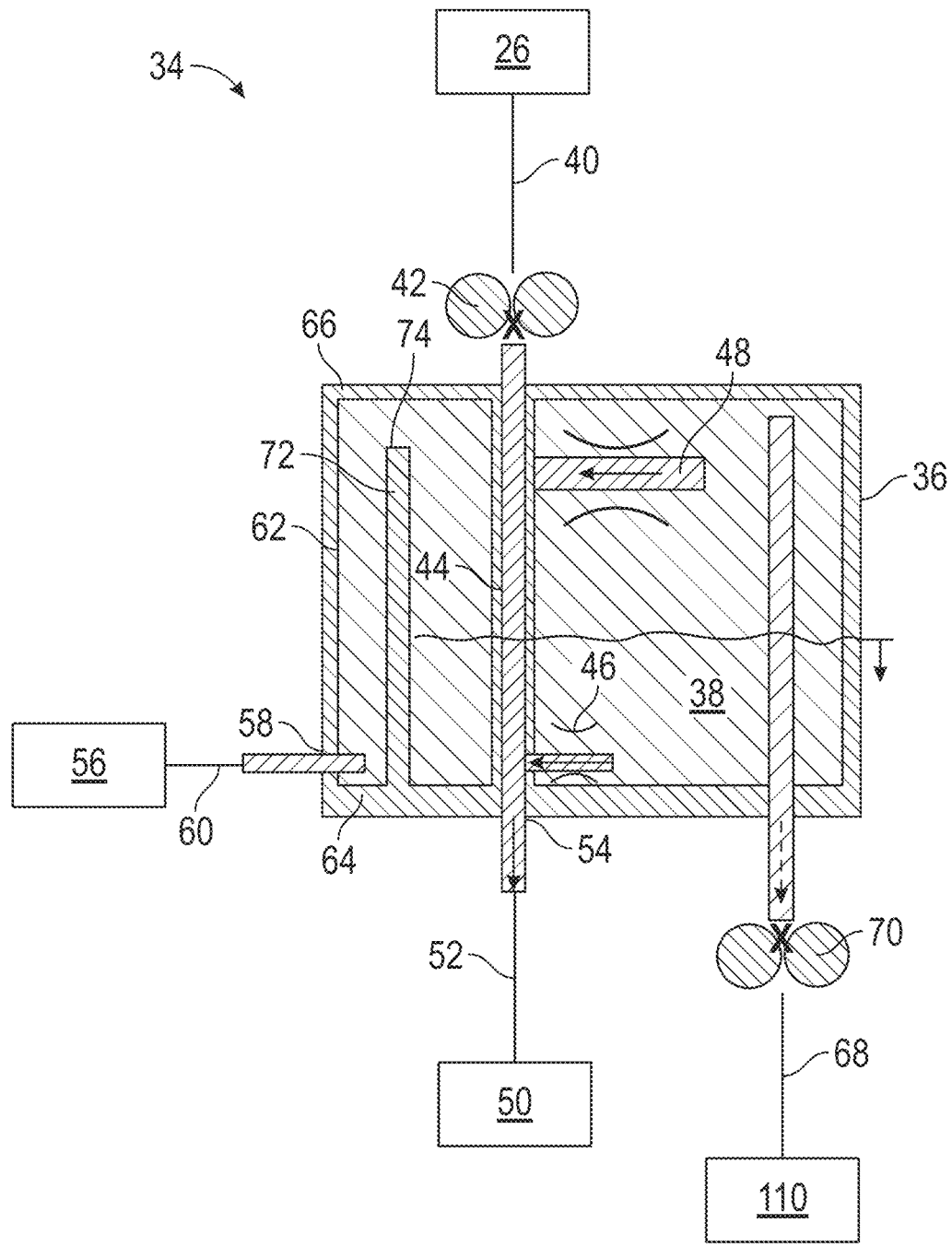
FIG. 3 is a schematic illustration of an embodiment of an oil reservoir of a gas turbine engine under a negative G operating condition.

Referring now to FIG. 3, in some conditions, the gas turbine engine 10 and the oil reservoir 34 operate in a negative G condition, where gravity is reversed, which is illustrated herein by inverting FIG. 3 relative to FIG. 2. Under such conditions, no or very low oil pressure is brought into the oil reservoir 34 via the gearbox passage 40. Because of this, oil is directed from the oil reservoir 34 via the side passage 48 and along the housing passage 44 to exit via the journal bearing passage 52. Once the oil level in the oil reservoir 34 reaches a wall end 74 of the separator wall 72, the flow of oil through the output passage 60 is automatically stopped, thus prioritizing the lubrication of the journal bearings 50. Once the oil level is below the side passage 48, the oil then will continue to flow from the side passage 46, which may have a smaller cross-sectional flow area than the side passage 48. The cross-sectional flow area of the side passage 46 is sized to drain the oil reservoir 34 in a preselected duration of time, which may correspond to a maximum design time for a negative G operating condition.

This oil reservoir 34 configuration allows for the use of journal bearings 50 in the reduction gear box 26 by providing for necessary lubrication of the journal bearings during negative G operations. The journal bearings are relatively compact, thus allowing for a reduction in volume of the reduction gear box 26.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A lubrication system of a gas turbine engine, comprising:
   a lubricant reservoir including a housing having a volume of oil disposed therein;
   a reservoir passage extending through the housing from a first housing wall to a second housing wall opposite the first housing wall;
   one or more side passages extending from the reservoir passage into an interior of the housing configured to selectably fill or drain the volume of oil;
   an output passage separate and distinct from the reservoir passage; and
   a separator wall extending into the interior of the housing from the first housing wall toward the second housing wall and between the reservoir passage and the output passage;
   wherein when the lubricant reservoir is in a first orientation, the lubricant reservoir is filled via oil flowed through the reservoir passage from the first housing end; and
   wherein when operated in a negative G orientation, the lubricant reservoir is drained via oil flowed through the reservoir passage and out of the second housing end.

2. The lubrication system of claim 1, wherein when the lubricant reservoir is in the second orientation the flow of oil out of the lubricant reservoir via the output passage is stopped.

3. The lubrication system of claim 1, wherein the one or more side passages is at least two side passages, and
   a first side passage of the at least two side passages has a first cross-sectional area greater than a second cross-sectional area of a second side passage of the at least two side passages.

4. The lubrication system of claim 1, wherein the output passage extends from a side wall of the housing between the first housing wall and the second housing wall.

5. The lubrication system of claim 1, further comprising a feathering passage extending into the lubricant reservoir.

6. The lubrication system of claim 5, further comprising a feathering pump operably connected to the feathering passage to urge oil from the lubricant reservoir via the feathering passage.

7. The lubrication system of claim 1, further comprising a main pump operably connected to the reservoir passage to urge flow through the reservoir passage.

8. A reduction gear box system of a gas turbine engine, comprising:
   a reduction gear box having one or more journal bearings therein;
   a lubricant reservoir configured to provide a flow of oil to the reduction gearbox, the lubricant reservoir including:
   a housing;
   a volume of oil disposed in the housing;
   a reservoir passage extending through the housing from a first housing wall to a second housing wall opposite the first housing wall, the reservoir passage configured to provide the flow of oil to the one or more journal bearings;
   one or more side passages extending from the reservoir passage into an interior of the housing configured to selectably fill or drain the volume of oil;
   an output passage extending from the housing separate and distinct from the reservoir passage; and a separator wall extending into the interior of the housing from the first housing wall toward the second housing wall and between the reservoir passage and the output passage;

wherein when the lubricant reservoir is in a first orientation, the lubricant reservoir is filled via oil flowed through the reservoir passage from the first housing end; and wherein when operated in a negative G orientation, the lubricant reservoir is drained via oil flowed through the reservoir passage and out of the second housing end.

9. The reduction gear box system of claim 8, wherein when the lubricant reservoir is in the second orientation the flow of oil out of the lubricant reservoir via the output passage is stopped.

10. The reduction gear box system of claim 8, wherein the one or more side passages is at least two side passages, and
a first side passage of the at least two side passages has a first cross-sectional area greater than a second cross-sectional area of a second side passage of the at least two side passages.

11. The reduction gear box system of claim 8, wherein the output passage extends from a side wall of the housing between the first housing wall and the second housing wall.

12. The reduction gear box system of claim 8, further comprising a feathering passage extending into the lubricant reservoir.

13. The reduction gear box system of claim 12, further comprising a feathering pump operably connected to the feathering passage to urge oil from the lubricant reservoir via the feathering passage.

14. The reduction gear box system of claim 8, further comprising a main pump operably connected to the reservoir passage to urge flow through the reservoir passage.

15. A gas turbine engine, comprising:
a turbine shaft;
a propeller including a plurality of propeller blades, the propeller driven by a propeller shaft;
a reduction gear box operably connecting the turbine shaft to the propeller shaft;
a lubricant reservoir configured to provide a flow of oil to the reduction gearbox, the lubricant reservoir including:
a housing;
a volume of oil disposed in the housing;
a reservoir passage extending through the housing from a first housing wall to a second housing wall opposite the first housing wall, the reservoir passage configured to provide the flow of oil to the one or more journal bearings of the reduction gear box;
one or more side passages extending from the reservoir passage into an interior of the housing configured to selectably fill or drain the volume of oil;
an output passage extending from the housing separate and distinct from the reservoir passage; and
a separator wall extending into the interior of the housing from the first housing wall toward the second housing wall and between the reservoir passage and the output passage;
wherein when the lubricant reservoir is in a first orientation, the lubricant reservoir is filled via oil flowed through the reservoir passage from the first housing end; and
wherein when operated in a negative G orientation, the lubricant reservoir is drained via oil flowed through the reservoir passage and out of the second housing end.

16. The gas turbine engine of claim 15, wherein when the lubricant reservoir is in the second orientation the flow of oil out of the lubricant reservoir via the output passage is stopped.

17. The gas turbine engine of claim 15, wherein the one or more side passages is at least two side passages, and
a first side passage of the at least two side passages has a first cross-sectional area greater than a second cross-sectional area of a second side passage of the at least two side passages.

18. The gas turbine engine of claim 15, wherein the output passage extends from a side wall of the housing between the first housing wall and the second housing wall.

19. The gas turbine engine of claim 15, further comprising a feathering passage extending into the lubricant reservoir, the feathering passage configured to deliver a flow of oil for adjustment of a rotational position of the plurality of propeller blades.

20. The gas turbine engine of claim 15, further comprising a main pump further comprising a main pump operably connected to the reservoir passage to urge flow through the reservoir passage.

* * * * *